(12) United States Patent
Fahmy et al.

(10) Patent No.: US 8,509,677 B2
(45) Date of Patent: Aug. 13, 2013

(54) METHOD FOR UPDATING LOCATION INFORMATION ON A WIRELESS DEVICE

(75) Inventors: Samer Fahmy, Waterloo (CA); Gerhard Klassen, Waterloo (CA); Chris Wormald, Kitchener (CA)

(73) Assignee: Research In Motion Limited, Waterloo (CA)

( * ) Notice: Subject to any disclaimer, the term of this patent is extended or adjusted under 35 U.S.C. 154(b) by 1028 days.

(21) Appl. No.: 11/678,106

(22) Filed: Feb. 23, 2007

(65) Prior Publication Data

US 2008/0207224 A1 Aug. 28, 2008

(51) Int. Cl.
*H04W 88/02* (2009.01)

(52) U.S. Cl.
USPC ............................................................ 455/1

(58) Field of Classification Search
USPC .................................. 455/456.1–6
See application file for complete search history.

(56) References Cited

U.S. PATENT DOCUMENTS

| | | | |
|---|---|---|---|
| 5,889,770 A * | 3/1999 | Jokiaho et al. | 370/337 |
| 6,223,044 B1 * | 4/2001 | Schultz | 455/456.1 |
| 6,985,742 B1 | 1/2006 | Giniger et al. | |
| 7,015,830 B2 | 3/2006 | Flick | |
| 7,149,504 B1 * | 12/2006 | Weaver et al. | 455/414.2 |
| 2004/0156326 A1 | 8/2004 | Chithambaram | |
| 2004/0219932 A1 * | 11/2004 | Verteuil | 455/456.2 |
| 2005/0148344 A1 | 7/2005 | Fan et al. | |
| 2006/0258371 A1 | 11/2006 | Krishnamurthi et al. | |
| 2006/0276168 A1 | 12/2006 | Fuller, Jr. | |
| 2007/0130153 A1 | 6/2007 | Nachman et al. | |

OTHER PUBLICATIONS

Search Report issued by the European Patent Office dated Aug. 30, 2007 for corresponding European Patent Application No. 07102939.1.
International Search Report and Written Opinion of the International Searching Authority issued by the Canadian Intellectual Property Office dated May 9, 2008 for corresponding International Application No. PCT/CA2008/000345 filed Feb. 22, 2008.
Office Action Issued Oct. 25, 2012 by the Canadian Intellectual Property Office for Corresponding Canadian Patent Application No. 2,678,744.

* cited by examiner

*Primary Examiner* — Diane Mizrahi
(74) *Attorney, Agent, or Firm* — Gowling Lafleur Henderson LLP

(57) ABSTRACT

A method is provided for updating a position of a mobile device coupled to a wireless communication network via one of a plurality of base stations. The method comprising the following steps. A position of the mobile device is determined. The mobile device then waits for a predefined trigger notification before determining an updated position of the mobile device. The predefined trigger notification is generated in response to a motion trigger. A device configured to implement the method as well as a computer readable medium comprising instructions to implement the method are also provided.

19 Claims, 3 Drawing Sheets

METHOD FOR UPDATING LOCATION INFORMATION ON A WIRELESS DEVICE

The following relates generally to mobile communication devices, and more particularly to a method for an improved for updating a location information of the mobile devices.

BACKGROUND

Mobile communication devices have become popular for business and personal use due to a relatively recent increase in number of services and features that the devices and mobile infrastructures support. Handheld mobile communication devices, sometimes referred to as mobile devices, are essentially portable computers having wireless capability, and come in various forms. Examples of mobile devices include Personal Digital Assistants (PDAs), cellular phones and smart phones.

More recently, global positioning system (GPS) receivers have been integrated within such mobile devices for providing enhanced location-based services. In operation, a location-based application executing on the mobile device can use data obtained from a GPS receiver to provide a user with location information. This information can be used in conjunction with an application on the mobile device to provide the user with real-time location-based information.

In other implementations, the location-based application can use the data obtained from the GPS receiver as well as other data to send a request to an application server for desired information. If the mobile device is location aware, the request includes the current location of the device. The application server extracts content from a Geographic Information System (GIS) database and provides an appropriate response to the mobile device.

Accordingly, the application server can use real-time location-based information to provide a number of competitive advantages that come from accessing location information in real time. For example, mapping-applications can be used to provide the user with real-time mapping information. As another example, data can be pushed to the user in accordance with the user's determined geographic location.

Location-based applications can be generally divided into two categories: device-based location applications and server-based location applications.

Device-based location applications refer to applications run on GPS-equipped mobile devices. The device queries its current location via the GPS receiver and the application uses the device's current location information for providing service using GIS software installed on the device.

Server-based location applications refer to applications run on mobile devices that may or many not be GPS-equipped. Rather, a network server maintains a location of the mobile devices. This can be achieved by the mobile device obtaining its coordinates and transmitting them to the network server. Alternatively, the network server can obtain the location of the mobile device directly, using a number of known techniques. As long as the mobile device can connect with the network server, it can query its location from the network server rather than from the GPS receiver.

Accordingly, when designing a location-based application using either once of these types of applications, it is a challenge to determine how often the coordinates of the device should be obtained and/or transmitted to the network server.

A typical solution to this problem is to introduce polling. That is, at predetermined intervals, the mobile device obtains its location from the GPS receiver or the network server, depending on the implementation. However, obtaining the mobile device's location too infrequently may result in inadequate location information for the application. Conversely, obtaining the mobile device's location too frequently may place an unnecessary drain on the mobile device's battery and/or generate unnecessary data traffic.

The availability of mobile devices offering location-based services is expected to increase dramatically, and so are the related applications. Therefore, it can be seen that there is a need for an improved method for updating location information on a mobile device that addresses at least some of the concerns described above.

BRIEF DESCRIPTION OF THE DRAWINGS

Embodiments of the description will now be described by way of example only with reference to the following drawings in which.

DETAILED DESCRIPTION OF THE PREFERRED EMBODIMENTS

Accordingly, a method is provided for implementing a hybrid polling technique. The hybrid polling technique implements a polling system that dynamically adjusts polling times in accordance with predefined trigger notifications.

In accordance with an embodiment there is provided a method for updating a position of a mobile device coupled to a wireless communication network via one of a plurality of base stations, the method comprising the steps of: determining a position of the mobile device; and waiting for a predefined trigger notification before determining an updated position of the mobile device, the predefined trigger notification being generated in response to a motion trigger.

In accordance with a further embodiment there is provided a mobile device coupled to a wireless communication network via one of a plurality of base stations, the mobile device comprising: a positioning device configured to retrieve a position of the mobile device; and a microprocessor configured to enable the positioning device to retrieve the position in response to a predefined trigger notification, the predefined trigger notification being generated in response to a motion trigger.

In accordance with yet a further embodiment there is provided a computer readable medium comprising instructions which, when executed on a mobile device coupled to a wireless communication network via one of a plurality of base stations, cause the mobile device to implement the steps of: determining a position of the mobile device; and waiting for a predefined trigger notification before determining an updated position of the mobile device, the predefined trigger notification being generated in response to a motion trigger.

Figure 1:
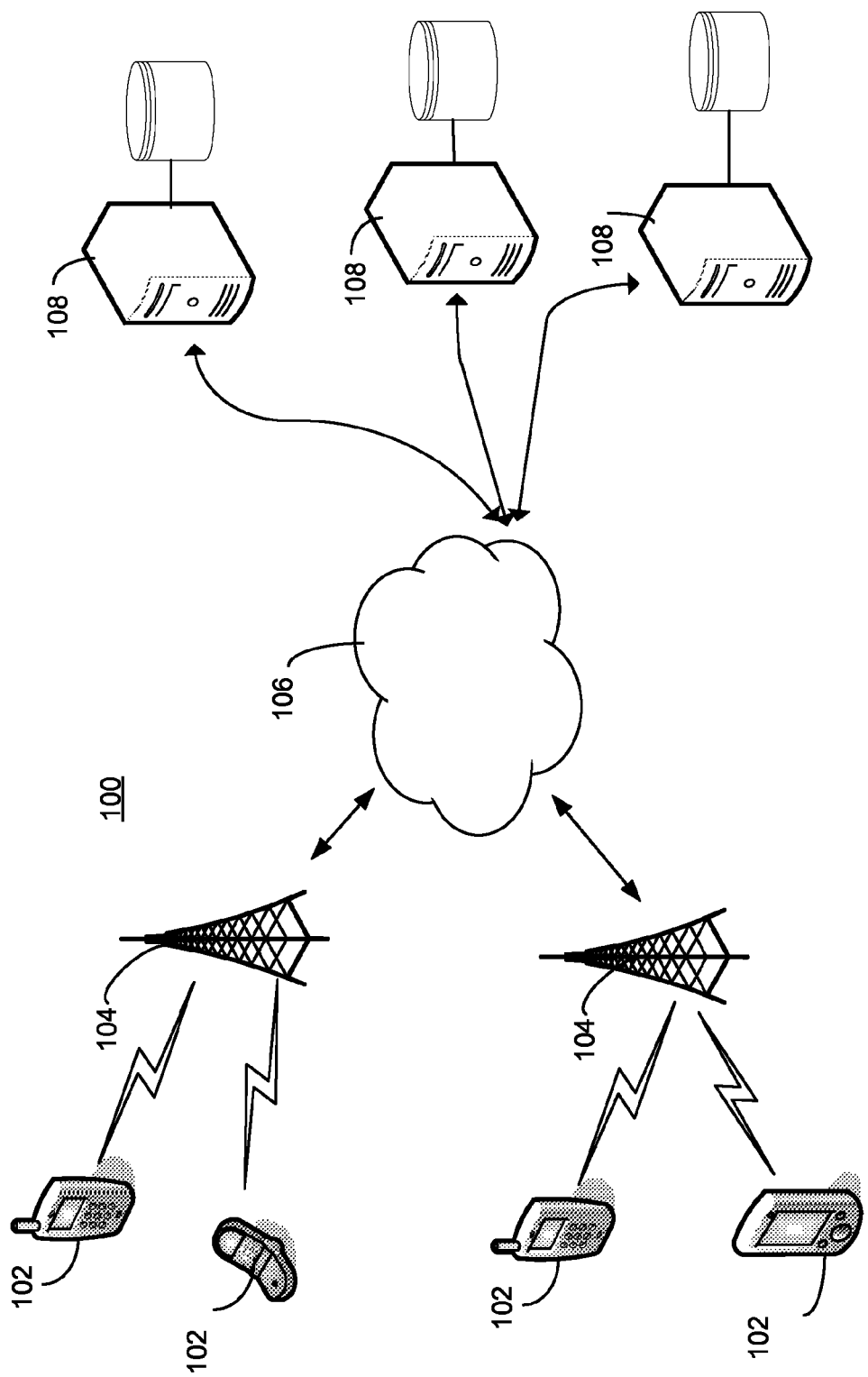
FIG. 1 is a block diagram illustrating a telecommunication infrastructure (prior)

For convenience, like numerals in the description refer to like structures in the drawings. Referring to FIG. 1, a typical telecommunication infrastructure is illustrated generally by numeral 100. The telecommunication infrastructure 100 includes a plurality of mobile devices 102, a plurality of base stations 104, a communication network 106 and a plurality of network servers 108.

The mobile devices 102 include wireless computing devices such as a smart phone, a personal digital assistant (PDA), and the like. The mobile devices 102 are in communication with one of the base stations 104. The base stations relay data between the mobile devices 102 and the network servers 108 via the communication network 106. Accordingly, the communication network 106 may include several components such as a wireless network, a relay, a corporate server and/or a mobile data server for relaying data between the base stations 104 and the network servers 108.

The network servers 108 include servers such as a Web server, an application server 108, and an application server with web services. It will be appreciated by a person of ordinary skill in the art that the telecommunication infrastructure 100 described herein is exemplary and that changes may be made to one or more components to accommodate different network configurations without affecting the scope of the invention described and claimed herein.

Figure 2:
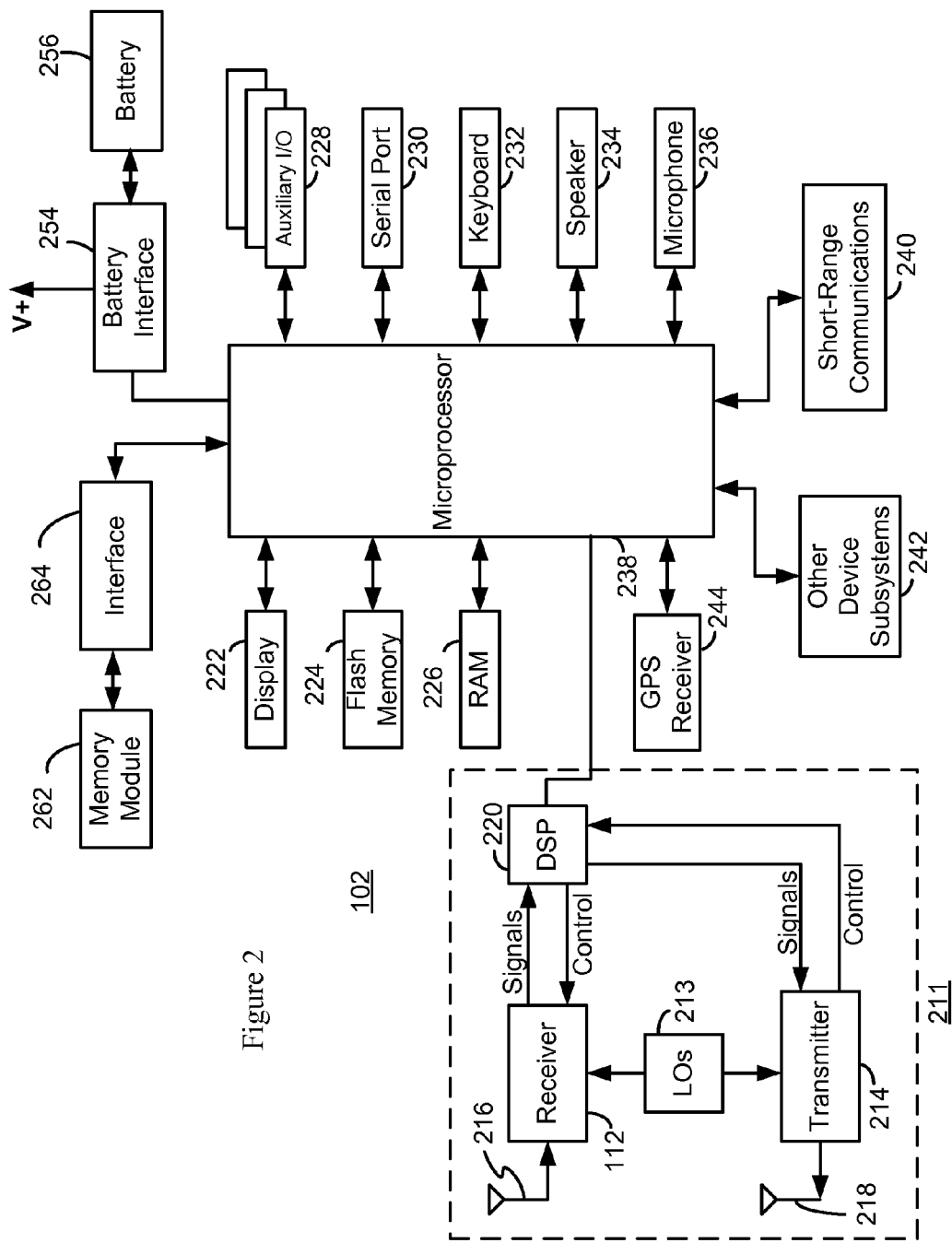
FIG. 2 is a block diagram illustrating components of a mobile device.

Referring to FIG. 2, a typical mobile device 102 is illustrated in greater detail. The mobile device 102 is often a two-way communication device having both voice and data communication capabilities, including the capability to communicate with other computer systems. Depending on the functionality provided by the device mobile 102, it may be referred to as a data messaging device, a two-way pager, a cellular telephone with data messaging capabilities, a wireless Internet appliance, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which mobile device 102 is intended to operate.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. Optionally, the mobile device 102 includes a positioning device 244, such as a GPS receiver, for receiving positioning information.

Operating system software used by the microprocessor 238 is preferably stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, preferably enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or preferably the persistent store 224, for execution by the microprocessor 238. Such flexibility in application installation increases the functionality of the mobile device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of mobile device 102, the user may have access to other types of input devices, such as, for example, a scroll wheel, light pen or touch sensitive screen.

Location-based applications executing on the mobile device 102 use positioning information from the positioning device 244 to provide relevant information to the user, often in real-time. The positioning device 244 may be a GPS receiver for receiving satellite broadcasts. In one embodiment, the satellite broadcast data is used by the mobile device 102 to determine its position. In another embodiment, the satellite broadcast data is transmitted from the mobile device to one of the network servers 108 to determine the position of the mobile device.

Alternatively, the positioning device 244 may be a positioning module for receiving positioning information from one of the network servers 108. In this embodiment, the positioning module may comprise a software, rather than a hardware, solution.

Accordingly, position update software is provisioned on the mobile device 102 that manages obtaining position updates. The position update software can be configured to implement one or more methods to manage the position updates, as described below. Further, different parameters relating to the implemented methods can be set and/or adjusted by either a system administrator or the user. The position update software is configured to limit the number of position updates while allowing a sufficient number of position updates to maintain relevant position information about the mobile device 102.

Figure 3:
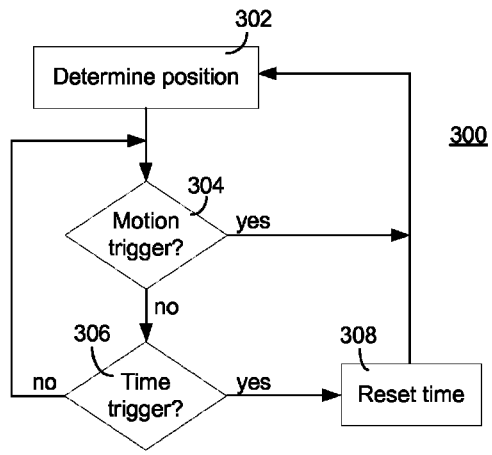
FIG. 3 is a flow chart illustrating a method for determining when to update location information of the mobile device.

Referring to FIG. 3, a flow chart illustrating a method for updating the position of a mobile device 102 is illustrated generally by numeral 300. At step 302, the position of the mobile device 102 is determined. It will be appreciated by a person of ordinary skill in the art, that the position can be determined using one or more of a number of state-of-the-art or proprietary methods.

The method then waits until a predefined trigger notification before determining the position of the mobile device 102 again. In the present embodiment, two types of notification triggers can generate a trigger notification. A first notification trigger occurs as a result of change in base stations, which can be determined, for example, by the communication subsystem 211 of the device. For ease of explanation this trigger will be referred to as a motion trigger. A second notification trigger occurs as a result of an expiration of a predefined period of time, also referred to as a polling period. The polling period can be monitored, for example, by a timer maintained by the position update software. For ease of explanation this trigger will be referred to as a time trigger.

At step 304, if a motion trigger is detected, the method returns to step 302, otherwise it continues at step 306. At step 306, if a time trigger is detected, the method continues at step 308. At step 308, the timer is reset and timing begins anew for the time trigger. The method then returns to step 302.

It will be appreciated that a change in base stations is a relatively good indicator that the mobile device 102 has changed its location. Accordingly, the position of the device is determined to ensure that the location information for the device is up-to-date.

Figure 4:
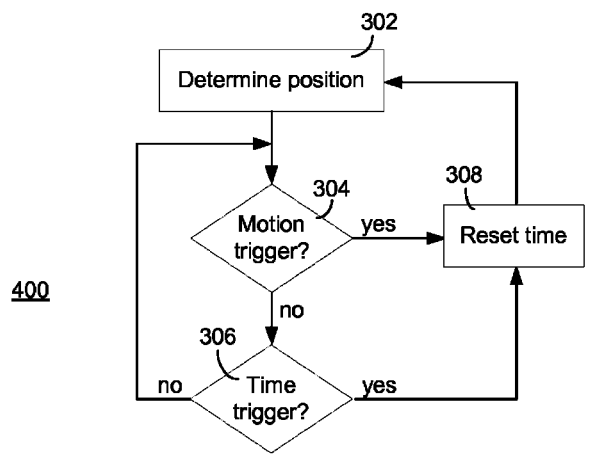
FIG. 4 is a flow chart illustrating an alternate method to that shown in FIG. 3.

Referring to FIG. 4, a flow chart illustrating a method for updating the position of a mobile device 102 in accordance with an alternate embodiment is illustrated generally by numeral 400. In accordance with the present embodiment, if a motion trigger is detected at step 304, the method continues at step 308. At step 308, the timer tracking the polling period is reset and timing begins anew for the time trigger. The method then returns to step 302.

Accordingly, it can be seen that the present embodiment limits unnecessary position updates in the case when a motion trigger occurs only a fraction of the polling period before the time trigger.

In accordance with yet a further embodiment, the software dynamically adjusts the polling period based on a number of predefined parameters. For example, if it is determined that the mobile device 102 has not moved after a predefined number of elapsed polling periods, the polling frequency is reduced. Conversely, if it is determined that the mobile device 102 has moved in each of a predefined number of polling periods, the polling frequency is increased. In both examples, an upper and lower limit may be placed on the polling frequency. Further, a default initial polling frequency may be established. Whether or not a device has moved can be determined either by a change in base station 104 or a change in location as identified by the positioning device 244.

It will be appreciated that, depending on the setup, the polling frequency may be increased or decreased either in small or large segments. Consider, for example, the case when the mobile device 102 has stopped moving. After a predefined number of polling periods, the software determines that the mobile device 102 has likely stopped and reduces the polling frequency accordingly. The reduction in polling frequency may be related to the number of predefined polling periods that pass before making the determination. That is, as more polling periods pass without detecting a change in position for the mobile device 102, the greater the likelihood that the mobile device 102 has stopped.

Therefore, if a large number of polling periods pass before adjusting the polling frequency, the more likely it will be that the mobile device 104 has actually stopped. Accordingly, the polling frequency can likely be reduced substantially, for example from every fifteen minutes to every half-an-hour. On the contrary, if only a few polling periods pass before adjusting the polling frequency, it will be less certain that the mobile device 102 has actually stopped. Accordingly, the polling frequency is gradually reduced, for example from every fifteen minutes to every twenty minutes, then to every twenty-five minutes, and finally to every half-an-hour.

Similarly, when the motion trigger is detected for the mobile device 102, the polling frequency may be incremented. The increase in polling frequency may occur either in small or large segments. This occurs similar to the decrease in polling frequency as described above. In the present embodiment, when a motion trigger is detected after the polling frequency of the mobile device 102 has been reduced, the polling frequency is returned to at least the default polling frequency.

In accordance with yet a further embodiment, the position update software has predefined time-of-day settings. The time-of-day settings allow a user or administrator to identify times that the mobile device 102 will likely be in one place for an extended period of time. Such times include daily work times for users in an office environment and sleep times. During such predefined stationary time periods, the position update software automatically reduces the polling frequency since it is unlikely that the mobile device 102 will be moving.

In accordance with yet a further embodiment, the position update software includes pattern recognition capability to recognize predefined patterns that may incorrectly identify motion. For example, consider a mobile device 102 that is relatively stationary and located at a border region between two base adjacent stations 104. Little, if any, motion may cause the mobile device 102 to oscillate back and forth between the base stations 104 for communicating with the communication network 106. Accordingly, if the position update software recognizes the oscillating pattern it uses this information to balance the affect of frequently detecting motion triggers when determining how to modify the polling period.

Further, in addition to the above, the position update software is configured to be able to communicate with calendar software operating on the mobile device 102 to determine likely stationary time periods.

The invention claimed is:

1. A method for updating a position of a mobile device coupled to a wireless communication network via one of a plurality of base stations, the method comprising:
 determining a position of the mobile device; and
 waiting for a predefined trigger notification before determining an updated position of the mobile device, the predefined trigger notification being generated in response to either a motion trigger or a time trigger, the time trigger being reset upon detection of the motion trigger, the time trigger comprising expiration of a polling time period, the polling time period determinative of a polling frequency, the polling frequency being reduced when the mobile device is determined to be stationary.

2. The method of claim 1, wherein the motion trigger comprises a change in base station with which the mobile device communicates.

3. The method of claim 1, wherein the mobile device is determined to be stationary when no motion trigger is detected after a predefined number of detected time triggers.

4. The method of claim 1, wherein the predefined time period is changed in small segments.

5. The method of claim 1, wherein the predefined time period is changed in large segments.

6. The method of claim 1, wherein the predefined time period is changed in accordance with time-of-day settings.

7. The method of claim 6, wherein the time-of-day settings are determined from a calendar application executing on the mobile device.

8. The method of claim 6, wherein the time-of-day settings are set by a user of the mobile device.

9. The method of claim 6, wherein the time-of-day settings are set by a system administrator of the mobile device.

10. The method of claim 1, further comprising the step of detecting a pattern of a plurality of generated motion triggers for further determining a likelihood that the mobile device is in motion.

11. A mobile device coupled to a wireless communication network via one of a plurality of base stations, the mobile device comprising:
 a positioning device configured to retrieve a position of the mobile device; and
 a microprocessor configured to enable the positioning device to retrieve the position in response to a predefined trigger notification, the predefined trigger notification being generated in response to either a motion trigger or a time trigger, the time trigger being reset upon detection of the motion trigger, the time trigger comprising expiration of a polling time period, the polling time period determinative of a polling frequency, the polling frequency being reduced when the mobile device is determined to be stationary.

12. The mobile device of claim 11, further comprising a communication subsystem for generating the motion trigger in response to a change of base station.

13. The mobile device of claim 11, wherein wherein the mobile device is determined to be stationary when no motion trigger is detected after a predefined number of detected time triggers.

14. The mobile device of claim 11, wherein the predefined time period is changed in small segments.

15. The mobile device of claim 11, wherein the predefined time period is changed in large segments.

16. The mobile device of claim 11, wherein the predefined time period is changed in accordance with time-of-day settings.

17. The mobile device of claim 16, further comprising a calendar application, wherein the time-of-day settings are determined from the calendar application.

18. The mobile device of claim 16, wherein the microprocessor is further configured to detect a pattern of a plurality of generated motion triggers for further determining a likelihood that the mobile device is in motion.

19. A computer readable medium comprising instructions which, when executed on a mobile device coupled to a wireless communication network via one of a plurality of base stations, cause the mobile device to:

determine a position of the mobile device; and wait for a predefined trigger notification before determining an updated position of the mobile device, the predefined trigger notification being generated in response to either a motion trigger or a time trigger, the time trigger being reset upon detection of the motion trigger, wherein the time trigger comprising expiration of a polling time period, the polling time period determinative of a polling frequency, the polling frequency being reduced when the mobile device is determined to be stationary.

* * * * *